United States Patent
Huber et al.

[11] Patent Number: 6,125,984
[45] Date of Patent: Oct. 3, 2000

[54] BALL MAT

[75] Inventors: Thomas Huber, Iffeldorf; Martin Durrwaechter, Irschenberg; Andreas Patzlsperger, Waakirchen, all of Germany

[73] Assignee: Telair International GmbH, Hausham, Germany

[21] Appl. No.: 09/194,233

[22] PCT Filed: Mar. 18, 1998

[86] PCT No.: PCT/EP98/01585

§ 371 Date: Jul. 2, 1999

§ 102(e) Date: Jul. 2, 1999

[87] PCT Pub. No.: WO98/42566

PCT Pub. Date: Oct. 1, 1998

[30] Foreign Application Priority Data

May 14, 1998 [DE] Germany .......................... 197 12 279

[51] Int. Cl.[7] .................................................. B65G 13/00
[52] U.S. Cl. ...................................................... 193/35 MD
[58] Field of Search ........................................ 193/35 MD

[56] References Cited

U.S. PATENT DOCUMENTS

| | | | |
|---|---|---|---|
| 3,020,993 | 2/1962 | Heinrich et al. | |
| 3,902,583 | 9/1975 | Laibson et al. | 193/35 |
| 4,000,870 | 1/1977 | Davies | 244/118 |
| 4,077,590 | 3/1978 | Shorey | 244/118 |
| 4,696,583 | 9/1987 | Gorges | 193/35 MD X |
| 4,784,194 | 11/1988 | Dannel | 193/35 MD X |
| 5,390,775 | 2/1995 | Herrick et al. | 193/35 MD X |
| 5,464,086 | 11/1995 | Loelln | 193/35 MD |
| 5,890,582 | 4/1999 | McKinnon et al. | 193/35 MD X |

FOREIGN PATENT DOCUMENTS 118923  3/1965  Germany .

OTHER PUBLICATIONS

Modular Microprocessor Controlled pp. 38–40.
Internation Search Report, dated Jul. 14, 1998.

*Primary Examiner*—James R. Bidwell
*Attorney, Agent, or Firm*—Howard & Howard

[57] ABSTRACT

A ball mat for the loading deck of an aircraft is a known device to support cargo and assist the movement thereof. The ball mat comprises a cover plate (11), a floor plate (12) that extends substantially parallel to the cover plate (11), and a plurality of holders (13) into which balls (14) or ball elements (15) can be inserted, wherein the cover plate (11) comprises apertures (18) through which the holders for the balls (14) or ball elements (15) can be inserted, and wherein between cover plate (11) and floor plate (12) there is defined an interior (16) within which the holders (13) are disposed. The remaining space within the interior (16) is filled with foam to increase the stability of the ball mat and/or to prevent moisture from entering and/or from spreading therein.

7 Claims, 6 Drawing Sheets

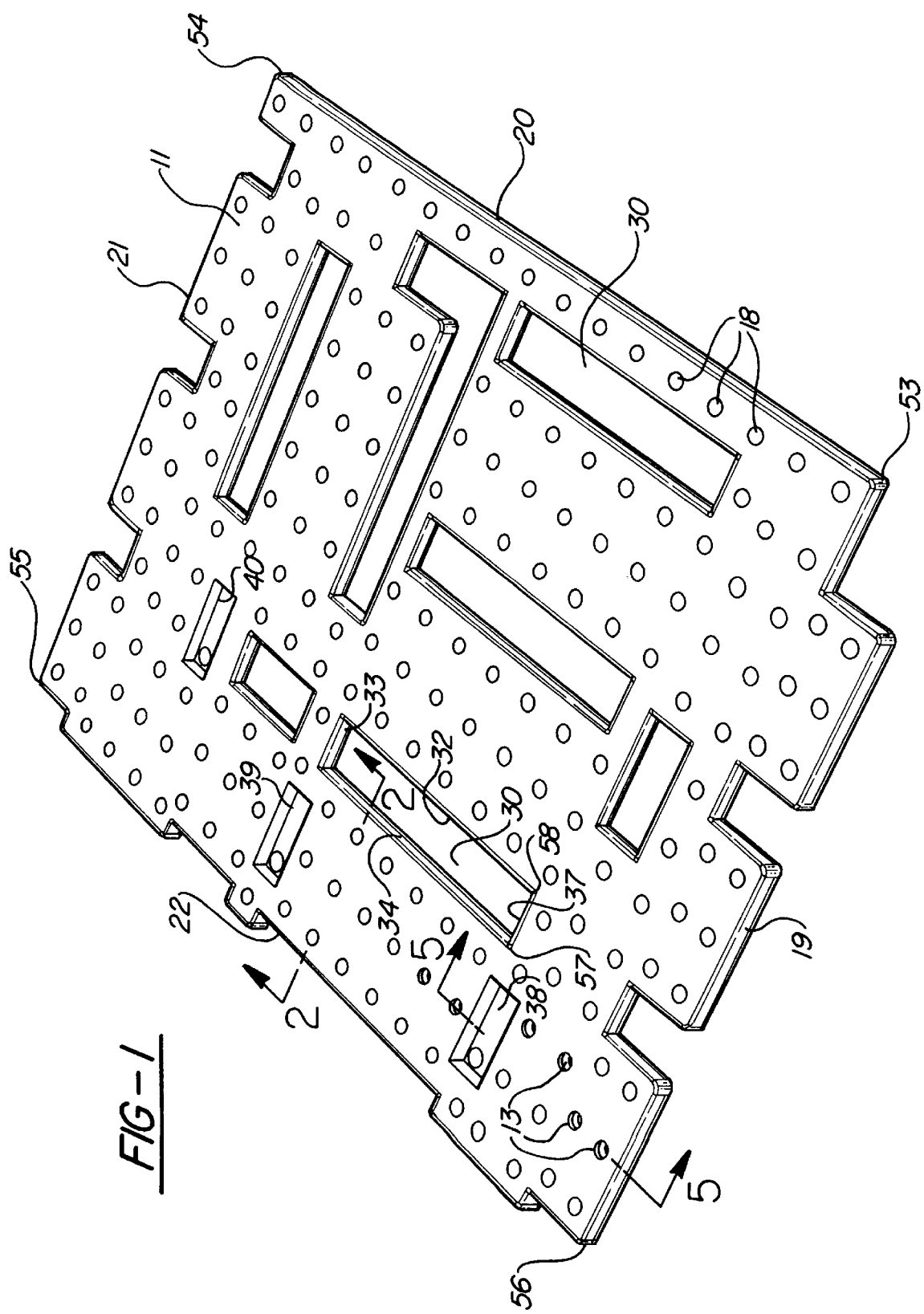

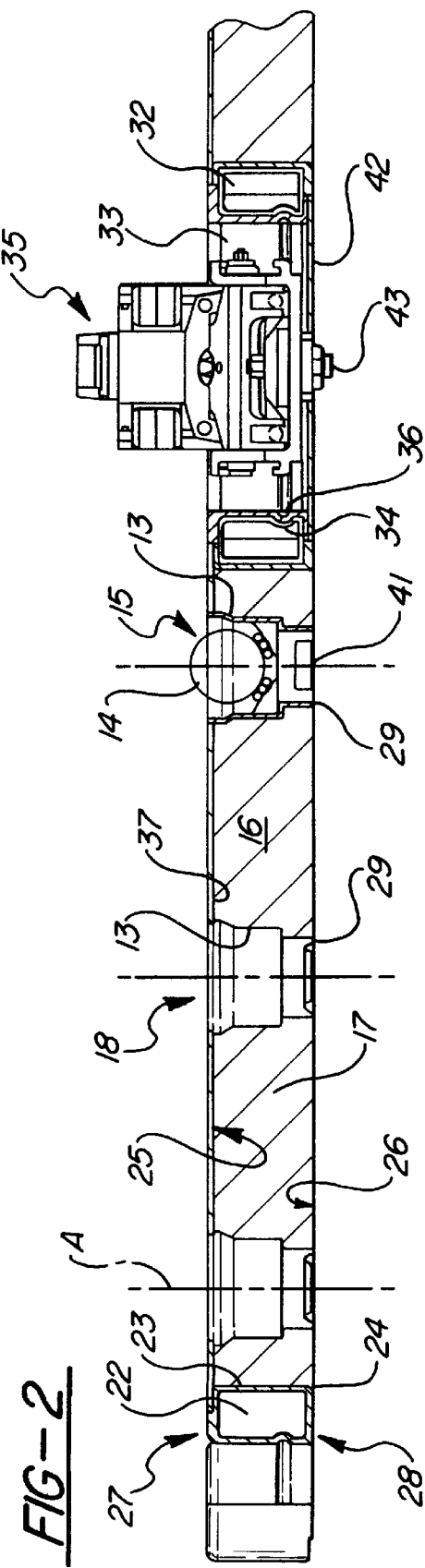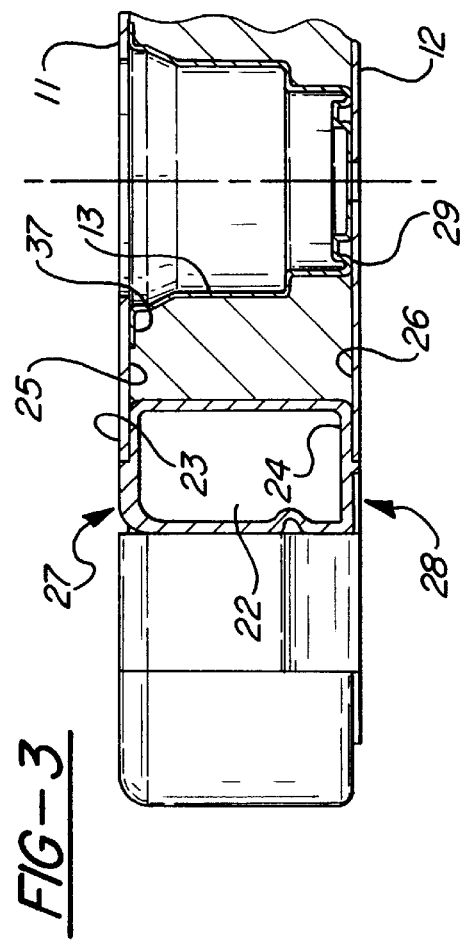

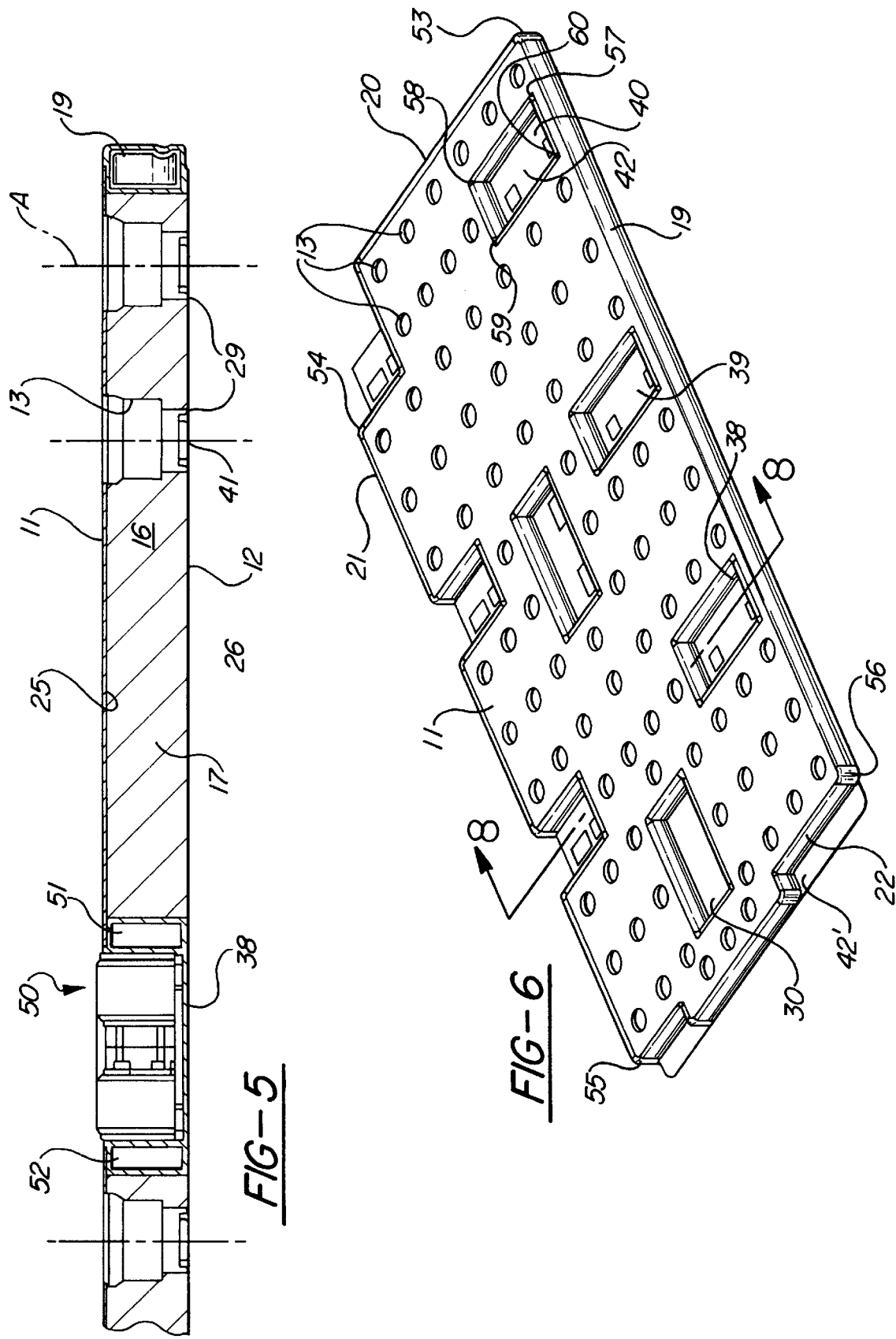

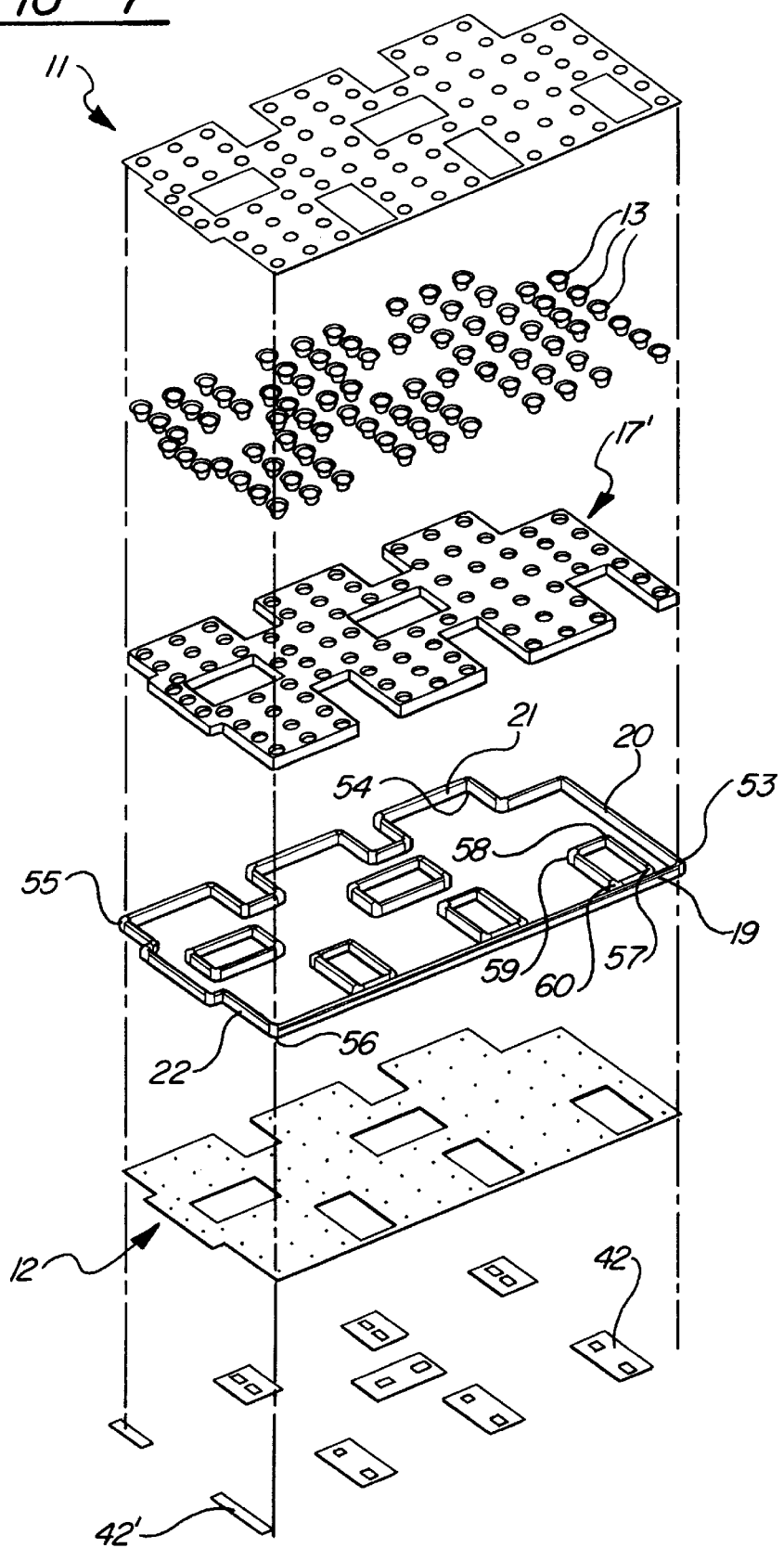

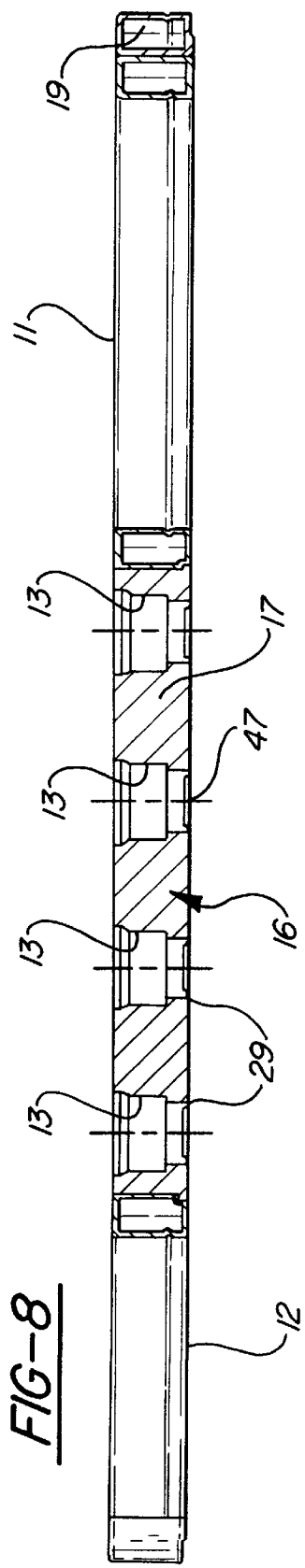
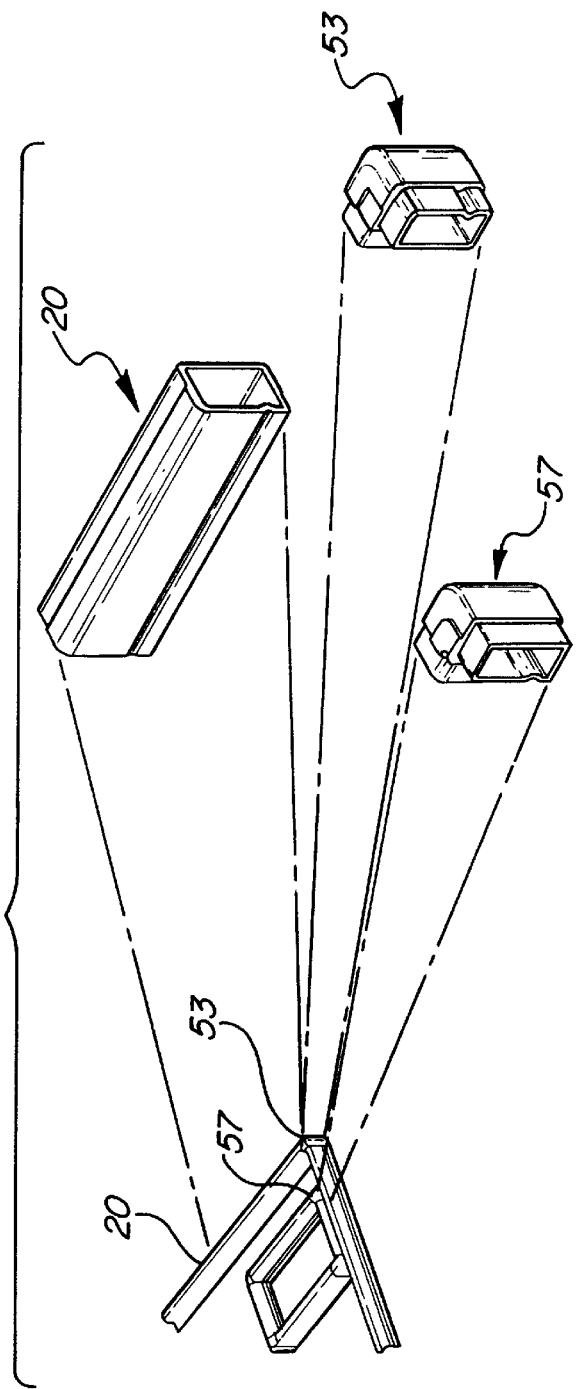
FIG-8
FIG-9

BALL MAT

BACKGROUND OF THE INVENTION

The invention relates to a ball mat for the loading deck of an aircraft, to support cargo and assist the movement thereof.

Known ball mats comprise a cover plate and a floor plate that is disposed substantially parallel to the cover plate. In addition holders are provided into which balls or ball elements can be inserted, by way of apertures in the cover plate, and between the cover and floor plates an interior space is defined, within which the holders are disposed.

The balls, a segment of which extends above the cover plate, at their uppermost points define a plane on which cargo can be shifted with very slight frictional losses.

SUMMARY OF THE INVENTION

The object of the present invention is to make the ball mat more resistant for its use in aircraft while nevertheless keeping its unladen weight low.

One advantage in each of the three proposed improvements is that the ball mat is stiffened without appreciably increasing its unladen weight.

A further advantage is that as a result of the proposed improvements the ball mat can be made splashproof or water-repellent in a simple manner.

According to a first aspect of the present invention, the interior of the ball mat, in the space remaining between cover plate, floor plate and holders, is filled with foam or with a body that has a foamy consistency. Because of the insertion of foam and presence of the foamed body thus formed, vertical loads imposed on the cover plate can be distributed. When the ball mat is filled with foam, the thickness of the material of which the cover plate is made can in some circumstances be reduced.

Furthermore, when the interior is so filled, an entrance or spreading of moisture is counteracted.

According to a second aspect of the present invention, the holders to contain the balls or ball elements, inserted into apertures in the cover plate, stand directly on the floor plate of the ball mat, so that these holders connect the cover and floor plates to one another arid act as spacing and stiffening elements for the ball mat. As a result of this measure, loads imposed on the ball elements are borne simultaneously by the cover plate and the floor plate, so that the imposed loads are uniformly distributed.

According to a third aspect of the present invention, the side profiles disposed at the lateral edges of the ball mat are inserted between the cover plate and the floor plate, to serve as spacing and stiffening elements. Each of these side profiles comprises two bearing surfaces, on opposite sides of the profile and extending in its long direction. These two surfaces come into contact over their entire areas with the insides of the cover and floor plates, i.e. the surfaces of the latter that face the interior, in such a way that (in addition to the stiffening action) a substantially splashproof seal is formed between side profile and cover plate as well as between side profile and floor plate.

Joining the parts to one another by adhesive further increases the stiffness/stability and additionally counteracts an entry of liquid. Adhesive connections are particularly useful when the measure of filling the cavity with foam is omitted.

It is self-evident that the three independently claimed different measures to increase the resistance of the ball mat can also be combined with one another, in pairs or all together. For example, it appears that an especially advantageous ball mat is one in which the interior is filled with foam as described, while at the same time its side profiles have extensive bearing surfaces in contact with the insides of the cover and floor plates.

In an advantageous further development of the third aspect, the upper and/or lower surfaces of the side profiles are flush with the outsides of the cover plate and floor plate, respectively. As a result, on the outer surfaces there is a smooth transition between cover plate, side profiles and floor plate. The ball mat thus has a particularly smooth and compact form. No surface is vulnerable to mechanical forces that might damage the splashproof seal between each side profile and the cover and floor plates.

With respect to all the aspects cited, it is advantageous if the holders for the balls or ball elements are provided with devices to seal them to the cover plate and/or the floor plate. These sealing devices prevent liquid that penetrates the mat by way of the ball elements from spreading out in the remaining interior of the mat. Indeed, the arrangement can be so designed that liquid flows down through the ball element and out of the mat, through a bore in the floor plate disposed directly below the ball element.

For this purpose, to form a seal against the floor plate the holder can be provided with an annular projection that is concentric with the axis (A) of the holder. However, an annular projection of this kind is not only advantageous with respect to its sealing function; by means of an annular projection the loads transmitted to the ball element are distributed over a relatively large region of the floor plate of the ball mat.

In the case of the holders, too, an adhesive connection to the cover and/or floor plate can increase stiffness and additionally counteract an entrance of liquid into the interior.

BRIEF DESCRIPTION OF THE DRAWINGS

In the following the invention is explained, also with respect to further characteristics and advantages, by the description of an exemplary embodiment with reference to the attached drawings, wherein FIG. 1 shows an embodiment of a ball mat in perspective view from above;

FIG. 2 is a sectional view along the line II—II in FIG. 1;

FIG. 3 shows an enlarged part of the sectional view according to FIG. 2;

FIG. 5 shows the ball mat in a sectional view along the line V—V in FIG. 1;

FIG. 6 shows a modified embodiment of a ball mat in perspective view from above;

FIG. 7 is an exploded view of the ball mat of FIG. 6;

FIG. 8 is a sectional view along the line VIII—VIII in FIG. 6 and

FIG. 9 is an enlarged view of side profiles as well as inner and outer corner pieces of the embodiments presented here.

DESCRIPTION OF THE PREFERRED EMBODIMENT

Figure 4:
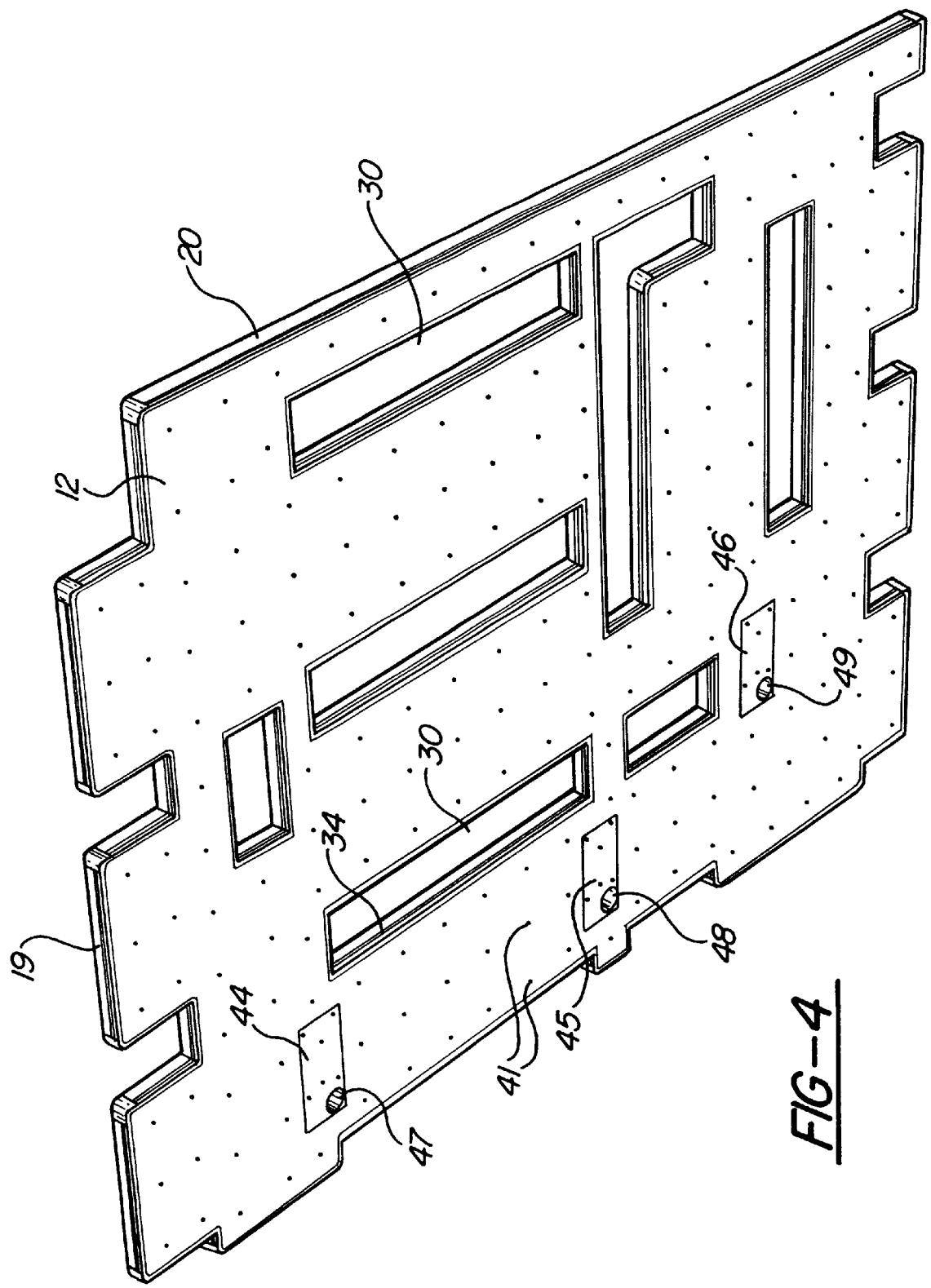
FIG. 4 shows the ball mat in perspective view diagonally from below.

In FIG. 1 an embodiment of a ball mat is viewed in perspective diagonally from above. The ball mat comprises a cover plate 11 and, parallel thereto, a floor plate 12 (cf. FIG. 2). At its sides the ball mat is bounded by side profiles

19, 20, 21, 22. The side profiles 19, 20, 21, 22 are joined to one another by corresponding outer corner pieces 53, 54, 55 and 56, which can be inserted into the side profiles. By the use of this technique, with appropriate modification of cover plate 11 and floor plate 12 there are almost infinitely many possible configurations of the ball-mat contours and openings (building-block system).

The cover plate 11, floor plate 12 and side profiles 19–22 between them define an interior 16. By way of apertures 18 in the cover plate 11 a plurality of holders 13 for ball elements 15 (cf. FIG. 2) is inserted into the interior 16. Corresponding ball elements are described in detail, for example, in the German patent DE 38 05 494.

The remaining space in the interior 16, in the embodiment shown here, is filled with foam, so that in the interior 16 of the ball mat a foamed body 17 is formed. The foamed body 17 stiffens the ball mat, attenuates vibrations and prevents moisture or liquids from spreading out within the interior 16.

In principle the interior 16 between cover plate 11 and floor plate 12 can also be filled with other material (e.g., balsa wood, special aluminum honeycomb cores or the like).

The ball mat shown in FIG. 1 further comprises three troughs 38, 39, 40, which are provided for the installation of drive units 50.

In addition, the ball mat comprises a plurality of openings 30 that allow latches 35 to be inserted. The latches 35 are provided to hold the cargo in place on the ball mat.

The structure of the ball mat shown in FIG. 1 can be still better understood by examining the view in FIG. 2, a section along the line II—II in FIG. 1. Between the cover plate 11 and the floor plate 12 the previously mentioned holders 13 for the ball elements 15 are seated; they have a substantially pot-like cylindrical shape. The positions of the holders 13 correspond to those of the apertures 18 in the cover plate 11. At their ends towards the underside of the cover plate 11 the holders 13 comprise devices 37 to act as gaskets, in order to create a—preferably watertight, at least for splashes—seal between cover plate 11 and holder 13. The sealing devices 37 are here constructed as a collar around the upper edge of the holder 13, such that the collar makes contact over a broad area with the lower surface of the cover plate 11.

The holder 13 for the ball element 15, which is indicated only schematically in FIG. 2, stands on the floor plate 12 by way of devices including an annular projection 29 or a circumferential collar. Upward out of the ball element 15 there projects an upper segment of a rotatably mounted ball 14. In the floor plate 12 a bore 41 concentric to the holder 13 is provided, through which any liquid that enters the ball element 15 can flow out. The ball element 15 comprises in its lower region a corresponding bore, which permits liquid that has entered to drain away.

Because the holder 13 is disposed between cover plate 11 and floor plate 12 as described, loads imposed vertically on the ball mat are transmitted to the holder 13 and uniformly transferred into the ball mat, in particular onto the floor plate 12.

The ball mat is interrupted by an opening 30 visible in the sectional view shown here. The opening 30 is bounded by side profiles 31, 32, 33, and 34 (cf. FIG. 1), which close the ball mat in a splashproof manner and stiffen it in the corresponding edge region The opening 30 is closed off at the bottom by a fixation plate 42, which over a region at the lower edges of the side profiles 31, 32, 33 and 34 is connected to the side profiles 31, . . . , 34, for example by blind rivets. On the fixation plate 42 a previously mentioned latch 35 is disposed. The latch 35 serves to hold cargo in place on the ball mat. At the same time the ball mat is fixed to the floor of the aircraft by way of the latch 35, by means of a bolt 43 connected to the latch 35.

The ball mat is thus fixed to the floor of the aircraft by way of the fixation plate 42 (and the latch 35). As a result of this relatively indirect attachment, transverse forces and vibrations, parallel to the cover plate, are attenuated before being transferred to the aircraft floor, which is relatively sensitive to such stresses. Sideways forces exerted directly on the latch 35 are also attenuated by the fixation plate 42, which thus also has a stabilizing action on the latch 35.

The side profiles 19, 20, 21 and 22 on their surfaces facing the inside of the opening comprise a groove that runs around the entire opening and is provided so that a lid, not shown here, can be set into the opening and locked in place. With such a lid, openings 30 can be closed off when not needed.

The structure of the side profile 22 bounding the outer edge of the ball mat corresponds to that of the side profiles 31, 32, 33 and 34 bounding the opening 30. Details are shown in FIG. 3.

In FIG. 3 the left part of the sectional view in FIG. 2 is enlarged. The side profile 22 has an upper side 27 and a lower side 28, such that the side profile 22 closes off the edge of the ball mat with its upper side 27 flush with the cover plate 11 and its lower side 28 flush with the floor plate 12. On its side towards the ball mat the side profile 22 is provided with planar bearing surfaces 23, 24 on its upper side 27 and lower side 28, respectively. As a result, the cover plate 11 and the floor plate 12 rest on the bearing surfaces 23, 24 of the side profile 22 in such a way that part of the side profile 22 extends into the mat, between cover plate 11 and floor plate 12.

The planar bearing surfaces 23, 24, which extend in the long direction of the side profile 22, respectively come into contact with the inner surfaces 25, 26 of cover plate 11 and floor plate 12, thus forming a splashproof seal. In addition, the ball mat is strengthened at its edges by side profiles arranged in this way.

In FIG. 4 the ball mat of FIG. 1 is shown in perspective, as viewed diagonally from below. The floor plate 12 can be seen, in which bores 41 are provided in positions corresponding to those of the holders 13 for the ball elements 15. The bores 41 allow liquids that may enter the ball elements or holders to drain away. Furthermore, in FIG. 4 the undersides 44, 45, 46 of the troughs 38, 39, 40 are visible. In the undersides 44, 45, 46 of the troughs 38, 39, 40 holes have been made through which cables can pass to the associated drive units.

FIG. 5 shows part of the ball mat in a sectional view along the line V—V in FIG. 1, such that the plane of section passes through a trough 38 for a drive unit 50, which is also shown in FIG. 5. The trough 38 for the drive unit 50 is—as can be seen in FIG. 5—constructed in one piece, such that side profiles 51, 52 of the trough are inserted completely between the cover plate 11 and the floor plate 12.

In FIG. 6 a modified embodiment of a ball mat is shown in perspective from above. For clarity, components the same as or corresponding to those of the ball mat according to FIGS. 1 to 5 are identified by the same reference numerals. The ball mat is shown fully assembled in FIG. 6. In this embodiment the space in the interior 16 is not filled with foam but rather packed with a solid body (e.g., of balsa wood). So that the entry of liquids can be reliably prevented, here all parts are attached to one another by adhesive or by way of a sealing device. The cover plate 11 can be painted with non-slip varnish to provide a secure footing.

In FIG. 7 the ball mat according to FIG. 6 is shown in exploded view. This drawing reveals how the ball mat in this embodiment is assembled. In addition, it clarifies how the ball-mat contours and edge cut-outs can be varied in a simple manner, as circumstances require.

At the top is the cover plate 11, which here consists of a metal sheet 1.5 mm thick. The shape of the cover plate 11 can be produced by laser cutting or stamping. The holders 13 and the side profiles 19, 20, 21 and 22 and 31, 32, 33 and 34 are riveted or glued to the cover plate.

Below the cover plate 11 the holders 13 are shown. Below these is the packing body 17, which in this embodiment is made of balsa wood. The side profiles 19, 20, 21, 22 and 31, 32, 33 and 34 shown below this are arranged to correspond to the outer contour of the cover plate 11 and floor plate 12 by connecting them with outside corner pieces 53, 54, 55 and 56 or inside corner pieces 57, 58, 59 and 60 (building-block system). At the bottom in FIG. 7 various fixation plates 42, 42' can be seen. These are riveted to the floor plate 12 and serve both to fix the ball mat to the floor of the aircraft and to provide a surface for mounting latches, drive units or the like.

In FIG. 8 a sectional view along the line VIII—VIII in FIG. 6 is shown.

FIG. 9 shows an enlarged view of a side profile 20, into which an outside corner piece 53 can be inserted. An inside corner piece 57 is also shown enlarged. It is evident from FIG. 9 that with side profiles 19, 20, 21 and 22 and side profiles 31, 32, 33 and 34 plus the outside corner pieces 53, . . . , 56 and inside corner pieces 57, 58, 59 and 60 nearly any desired contour of a ball mat can be created.

List of reference numerals

11 Cover plate
12 Floor plate
13 Holder
14 Balls
15 Ball elements
16 Interior
17, 17 ' Foamed body, packing body
18 Apertures
19, 20, 21 and 22 Side profiles
23, 24 Bearing surfaces
25, 26 Inner sides
27 Upper side (of side profiles)
28 Lower side (of side profiles)
29 Annular projection
30 Openings
31, 32, 33 and 34 Side profiles (of openings)
35 Latch
36 Groove
37 Sealing device
38, 39 and 40 Troughs
41 Bore
42, 42' Fixation plate
43 Bolt
44, 45 and 46 Underside (of troughs)
47, 49 Holes
50 Drive unit
51, 52 Side profile (trough)
53, 54, 55 and 56 Outside corner piece
57, 58, 59 and 60 Inside corner piece

What is claimed is:

1. A ball mat for the loading deck of an aircraft to support carbo and assist the movement thereof, wherein the ball mat comprises:

a cover plate (11) defining a plurality of apertures (18), a floor plate (12) extending substantially parallel to and spaced from said cover plate (11), and a plurality of holders (13) inserted in said apertures (18) for receiving ball elements (15) and said holders (13) being seated between said cover plate (11) and said floor plate (12) to act as spacing elements between said cover plate (11) and said floor plate (12) and to stiffen said ball mat and side profiles (31, 32, 33 and 34) extending between said cover plate (11) and said floor plate (12) to define rectangular openings (30).

2. A ball mat according to claim 1 wherein said holders (13) include devices (37, 29) for sealing tightly against at least one of said cover plate (11) and said floor plate (12).

3. A ball mat according to claim 1 wherein said holder (13) includes an annular projection (29) encircling the holder for bearing against floor plate (12).

4. A ball mat according to claim 1 including a latch (35) disposed in at least one of said openings (30) for anchoring the ball mat to a floor of an aircraft.

5. A ball mat according to claim 1 wherein said side profiles (31, 32, 33 34), in side openings (30) include a groove (36) extending in the long direction of said side profiles (31, 32, 33 34).

6. A ball mat according to claim 1 including a ball element (15) disposed in each of said holders (13).

7. A ball mat for the loading deck of an aircraft comprising;

a cover plate (11) defining a plurality of circular apertures (18) and a plurality of rectangular openings (30), a floor plate (12) defining a plurality of rectangular openings (30) aligned with said rectangular openings (30) in said cover plate (11), rectangular profile walls (31, 32, 33 34) extending between said cover plate (11) and said floor plate (12) about the periphery of said rectangular openings (30) to space said plates (11, 12) apart to define a space therebetween, a holder (13) disposed in each of said circular apertures (18) and extending between said plates (11, 12) to interconnect and reinforce said plates (11, 12), a ball element (15) disposed in each of said holders (13), side profile walls (19, 20, 21, 22) extending about the periphery of said plates (11, 12) and interconnecting said plates (11, 12) and a latch device disposed in at least one of said rectangular openings (30) for attachment to the deck of an aircraft.

* * * * *